US012718625B2

(12) United States Patent
Chacko et al.

(10) Patent No.: US 12,718,625 B2
(45) Date of Patent: Aug. 25, 2026

(54) METHOD AND SYSTEM FOR DYNAMICALLY PREDICTING DRIVING RANGE OF VEHICLES

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Jose Vincent, Chennai (IN)

(73) Assignee: HCL Technologies Limited, New Delhi (IN)

( * ) Notice: Subject to any disclaimer, the term of this patent is extended or adjusted under 35 U.S.C. 154(b) by 347 days.

(21) Appl. No.: 18/523,976

(22) Filed: Nov. 30, 2023

(65) Prior Publication Data

US 2024/0193999 A1 Jun. 13, 2024

(30) Foreign Application Priority Data

Dec. 8, 2022 (IN) ............................ 202211070987

(51) Int. Cl.
*G07C 5/00* (2006.01)
*B60L 58/12* (2019.01)
*G07C 5/08* (2006.01)

(52) U.S. Cl.
CPC .............. *G07C 5/004* (2013.01); *B60L 58/12* (2019.02); *G07C 5/0816* (2013.01)

(58) Field of Classification Search
CPC ........ G07C 5/004; G07C 5/0816; B60L 58/12
See application file for complete search history.

(56) References Cited

U.S. PATENT DOCUMENTS 7,483,908 B2 1/2009 Seliger et al.
9,121,719 B2 9/2015 Stankoulov
(Continued)

OTHER PUBLICATIONS

Liang Zhao, Wei Yao, Yu Wang, Jie Hu; "Machine Learning-Based Method for Remaining Range Prediction of Electric Vehicles"; IEEE; Nov. 24, 2020; pp. 212423-212441; vol. 8; China.
(Continued)

*Primary Examiner* — Steven Vu Nguyen
(74) *Attorney, Agent, or Firm* — Kendal M. Sheets

(57) ABSTRACT

A method and system dynamically predicting driving range of vehicles is disclosed. In some embodiments, the method includes dynamically determining real-time values corresponding to in-transit parameters associated with vehicle; and determining, via trained Machine Learning (ML) model, variance in in-transit parameters when compared with pre-defined parameters. Determining the variance includes identifying overlapping subset of parameters between in-transit parameters and pre-defined parameters; identifying non-overlapping subset of parameters between in-transit parameters and pre-defined parameters; determining difference in each of the real-time values determined for overlapping subset of parameters with corresponding optimal value; and computing variance based on non-overlapping subset of parameters and difference in real-time values determined for the overlapping subset of parameters. The method may include determining, via trained ML model, percentage deviation from absolute driving range associated with target vehicle based on determined variance; and predicting, via trained ML model, current driving range for vehicle based on identified percentage deviation.

23 Claims, 6 Drawing Sheets

(56) References Cited

U.S. PATENT DOCUMENTS

| | | | | |
|---|---|---|---|---|
| 9,834,111 | B2 | 12/2017 | Grewal et al. | |
| 10,124,675 | B2 | 11/2018 | Lu et al. | |
| 10,365,662 | B1 | 7/2019 | Hayward | |
| 10,859,391 | B2 * | 12/2020 | Beaurepaire | B60L 58/12 |
| 11,043,043 | B2 | 6/2021 | Wang et al. | |
| 11,200,757 | B2 * | 12/2021 | Maeda | B60W 40/12 |
| 11,325,494 | B2 | 5/2022 | Aykol et al. | |
| 2012/0109408 | A1 | 5/2012 | Siy et al. | |
| 2015/0332278 | A1 | 11/2015 | Garrido et al. | |
| 2022/0138575 | A1 * | 5/2022 | Bannenberg | G06F 11/3688 706/25 |

OTHER PUBLICATIONS

Shuai Sun, Jun Zhang,Jun Bi ,Yongxing Wang; A Machine Learning Method for Predicting Driving Range of Battery Electric Vehicles; Journal of Advanced Transportation; Sep. 1, 2019; vol. 2019; Beijing, China.

Sheng Tian, Chengwei Li, Qing Lv, Jia Li; Method for predicting the remaining mileage of electric vehiclesbased on dimension expansion and model fusion; IET Intelligent Transport Systems; IET Intell.; Apr. 8, 2022; China.

* cited by examiner

METHOD AND SYSTEM FOR DYNAMICALLY PREDICTING DRIVING RANGE OF VEHICLES

TECHNICAL FIELD

Generally, the invention relates to Machine Learning (ML). More specifically, the invention relates to method and system for dynamically predicting driving range of vehicles.

BACKGROUND

Today, desirability of Electric Vehicles (EVs) has increased significantly due to awareness of environmental and energy crises. With the reduction in petrol/fuel-based vehicles or combustion engine and rise in EVs, local emission may be reduced. Thus, the EVs can help in protecting the environment to a certain extent. The EVs range from Extended Range Electric Vehicles (EREV) to electric only vehicles (for example, Battery Electric Vehicle (BEV)). However, driving range that the EVs are capable of travelling is still quite unpredictable. This concern prevents users from considering the EVs as a genuine alternative to traditional vehicles. This issue may be resolved if the user is provided with an accurate prediction of driving range.

Various systems exist for predicting driving range of the EVs. However, the existing systems predict absolute driving range of the EVs. The absolute driving range predicted by the existing systems may be based on ideal environmental and vehicle conditions. The existing systems do not consider the in-transit factors and real-time data. For example, real-time temperature value may be different from ideal temperature value. Thus, the existing systems lack in dynamically predicting accurate driving range.

There is, therefore, a need to develop a system that may dynamically predict the driving range of EVs as well as of non-EVs precisely by determining percentage deviation from the absolute driving range.

SUMMARY OF INVENTION

In one embodiment, a method for dynamically predicting driving range of vehicles is disclosed. The method may include dynamically determining a set of real-time values corresponding to a plurality of in-transit parameters associated with a vehicle. The plurality of in-transit parameters may include a set of external parameters and a set of vehicle parameters. The method may further include determining, via a trained Machine Learning (ML) model, a variance in the plurality of in-transit parameters when compared with a set of pre-defined parameters. The variance may be determined by identifying an overlapping subset of parameters between the plurality of in-transit parameters and the set of pre-defined parameters, identifying a non-overlapping subset of parameters between the plurality of in-transit parameters and the set of pre-defined parameters, determining a difference in each of the real-time values determined for the overlapping subset of parameters with a corresponding optimal value, and computing the variance based on the non-overlapping subset of parameters and the difference in real-time values determined for the overlapping subset of parameters. The method may further include determining, via the trained ML model, a percentage deviation from an absolute driving range associated with the target vehicle based on the determined variance. The method may further include predicting, via the trained ML model, a current driving range for the vehicle based on the identified percentage deviation.

In another embodiment, a system for dynamically predicting driving range of vehicles is disclosed. The system may include a processor and a memory communicatively coupled to the processor. The memory may store processor-executable instructions, which, on execution, may cause the processor to dynamically determine a set of real-time values corresponding to a plurality of in-transit parameters associated with a vehicle. The plurality of in-transit parameters may include a set of external parameters and a set of vehicle parameters The processor-executable instructions, on execution, may further cause the processor to determine, via a trained ML model, a variance in the plurality of in-transit parameters when compared with a set of pre-defined parameters. The variance may be determined by identifying an overlapping subset of parameters between the plurality of in-transit parameters and the set of pre-defined parameters, identifying a non-overlapping subset of parameters between the plurality of in-transit parameters and the set of pre-defined parameters, determining a difference in each of the real-time values determined for the overlapping subset of parameters with a corresponding optimal value, and computing the variance based on the non-overlapping subset of parameters and the difference in real-time values determined for the overlapping subset of parameters. The processor-executable instructions, on execution, may further cause the processor to determine, via the trained ML model, a percentage deviation from an absolute driving range associated with the target vehicle based on the determined variance. The processor-executable instructions, on execution, may further cause the processor to predict, via the trained ML model, a current driving range for the vehicle based on the identified percentage deviation.

In yet another embodiment, a non-transitory computer-readable medium storing computer-executable instruction for dynamically predicting driving range of vehicles is disclosed. The stored instructions, when executed by a processor, may cause the processor to perform operations including dynamically determining a set of real-time values corresponding to a plurality of in-transit parameters associated with a vehicle. The plurality of in-transit parameters may include a set of external parameters and a set of vehicle parameters The operations may further include determining, via a trained ML model, a variance in the plurality of in-transit parameters when compared with a set of pre-defined parameters. The variance may be determined by identifying an overlapping subset of parameters between the plurality of in-transit parameters and the set of pre-defined parameters, identifying a non-overlapping subset of parameters between the plurality of in-transit parameters and the set of pre-defined parameters, determining a difference in each of the real-time values determined for the overlapping subset of parameters with a corresponding optimal value, and computing the variance based on the non-overlapping subset of parameters and the difference in real-time values determined for the overlapping subset of parameters. The operations may further include determining, via the trained ML model, a percentage deviation from an absolute driving range associated with the target vehicle based on the determined variance. The operations may further include predicting, via the trained ML model, a current driving range for the vehicle based on the identified percentage deviation.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
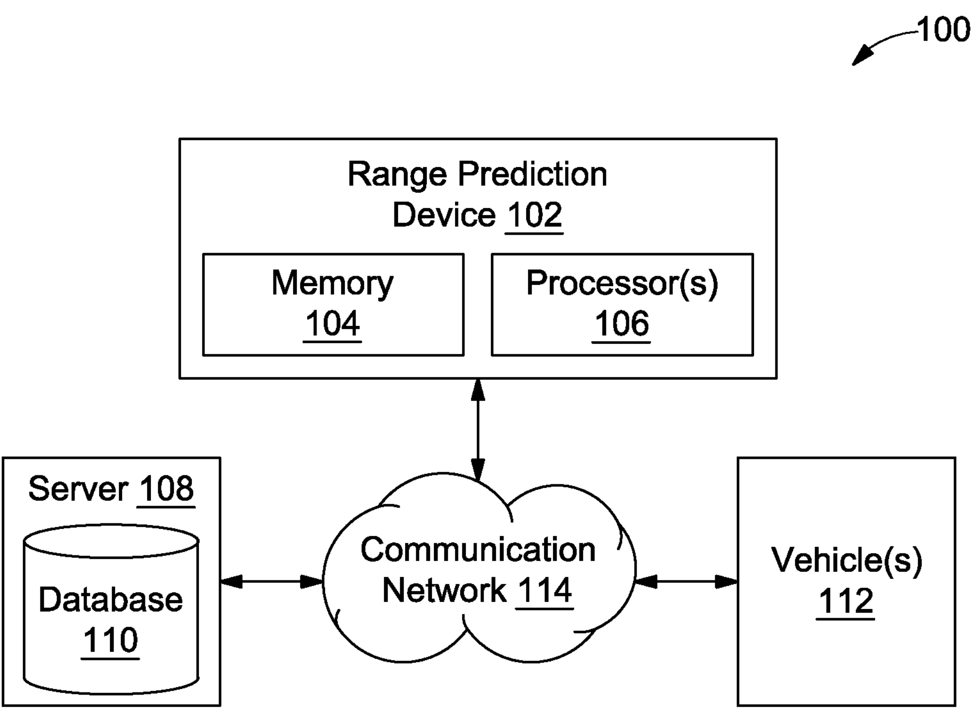
FIG. 1 is a block diagram illustrating a system for dynamically predicting driving range of vehicles, in accordance with an embodiment.

Referring now to FIG. 1, a block diagram of a system 100 for dynamically predicting driving range of vehicles is illustrated, in accordance with an embodiment. The system 100 may include range prediction device 102 that may dynamically predict driving range of vehicle(s) 112 and provide recommendations to corresponding users/drivers. To predict a driving range for a vehicle, the range prediction device 102 may determine percentage deviation from an ideal condition of the vehicle. For example, in the ideal condition, the vehicle may be consume '125' watt/hr energy during a normal travel (i.e., while travelling on a plain area) of '100' km/hr. However, when the vehicle uses an inclined path (i.e, uphill) or a declined path (i.e., downhill) then the driving range of the vehicle may differ. In that case, the range prediction device 102 may predict a current driving range for that vehicle which may be reduced (in case of uphill) from the ideal condition, for example 90 km/hr. (i.e., 10% reduction from the ideal driving range).

Examples of the range prediction device 102 may include, but are not limited to a smartphone, a laptop, a headset, vehicle dashboard, a headphone, air pods, a mobile phone, a smart watch, smart-band, a smart wearable, or any Bluetooth enabled device. The range prediction device 102 may include a memory 104, a processor 106, and a display (not shown in FIG. 1). The display may further include a user interface. A user or an administrator may interact with the range prediction device 102 and vice versa through the display. By way of an example, the display may be used to display results of analysis performed by the range prediction device 102 (such as, for displaying percentage deviation, current driving range, generated recommendations, and the like), to the user. By way of another example, the user interface may be used by the user to provide inputs to the range prediction device 102. For example, a user response corresponding to an accuracy of the recommendations, and penalty or reward to the ML model may be provided by the user using the user interface. Thus, for example, in some embodiments, the range prediction device 102 may ingest information provided by the user or the administrator via the user interface. Further, for example, in some embodiments, the range prediction device 102 may render results to the user or the administrator via the user interface.

The memory 104 may store instructions that, when executed by the processors 106, may cause the processors 106 to dynamically predict driving range of vehicles. As will be described in greater detail in conjunction with FIG. 2 to FIG. 6, in order to predict the driving range, the processor 106 in conjunction with the memory 104 may perform various functions including determining a set of real-time values, determining a variance, identifying an overlapping subset and a non-overlapping subset of parameters, percentage deviation determination, current driving range prediction, training the ML model, performing incremental training, and the like.

The memory 104 may also store various data (e.g., a plurality of in-transit parameters (external parameters and vehicle parameters), a set of pre-defined parameters, absolute driving range, user inputs etc.) that may be captured, processed, and/or required by the range prediction device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

Further, the range prediction device 102 may interact with a server 108 or the vehicle(s) 112 via a communication network 114 for sending and receiving various data. The communication network 114, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

By way of an example, in some embodiments, the range prediction device 102 may receive information from the server 108 or the vehicle(s) 112. The server 108 may further include a database 110, which may store information such as, external parameters, vehicle parameters, pre-defined parameters, ideal driving range, user inputs etc. Further, the vehicle(s) 112 may include, but may not be limited to, Electrical Vehicle (EV) or a fuel-based vehicle. The EV may include a Battery Electric Vehicle (BEV), a Plug-in Hybrid Electric Vehicles (PHEV), and a Hybrid Electric Vehicle (HEV).

It should be noted that the range prediction device 102 may be embedded in already existing vehicle(s). Initially, ideal data or ideal condition of the vehicle(s) may be captured. Further, depending on the current condition (for example, weather condition, road condition, traffic condition and the like), the data may be transformed, and respective energy and range may be noted. Also, it should be noted that level of current condition (for example, low, medium, high) may be considered which may influence the prediction results. With the change in current condition or change in associated parameters, percentage deviation in driving range may also change accordingly. The percentage deviation may be derived when compared to ideal conditions. The percentage deviation may be a positive percentage deviation or a negative percentage deviation. This may further help to identify the energy needed. The range prediction device 102 is applicable not only to EVs but to non-EVs as well.

Figure 2:
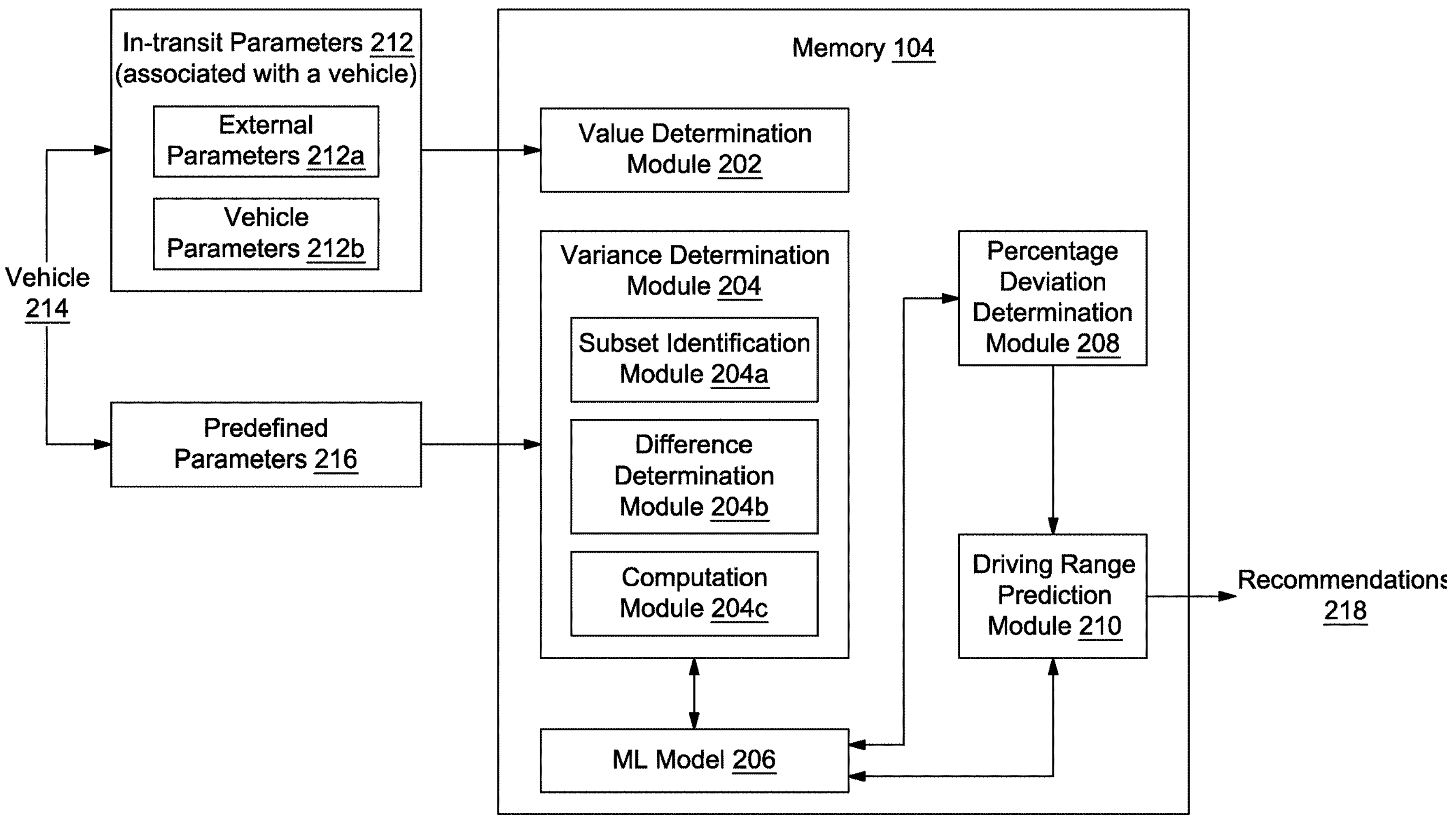
FIG. 2 is a functional block diagram of various modules within a memory of a range prediction device configured to dynamically predict driving range of vehicles, in accordance with an embodiment.

Referring now to FIG. 2, a block diagram of various modules the memory 104 of the range prediction device 102 configured to dynamically predict driving range of vehicles is illustrated, in accordance with an embodiment. In order to dynamically predict driving range of the vehicles, the memory 104 may include a value determination module 202, a variance determination module 204, a machine learning (ML) model 206, a percentage deviation determination module 208, and a driving range prediction module 210. Further, the memory 104 may also include a datastore to store various information and intermediate results generated by the modules 202-210. FIG. 2 is explained in conjunction with FIG. 1.

The value determination module 202 may be configured to receive a plurality of in-transit parameters 212 associated with a vehicle 214. The in-transit parameters 212 may include a set of external parameters 212*a* and a set of vehicle parameters 212*b*. The set of external parameters may include, but are not limited to, a total distance between a source location and a destination location, traffic density, a travel direction, current time, an average external temperature, an expected variation in temperature, aerodynamic conditions, a road inclination level, road condition, and weather conditions. Further, the set of vehicle parameters may include, but are not limited to, a number of travellers, weight within the vehicle, vehicle specifications, a driver driving score, and current functional condition of the vehicle. The traffic density may vary while covering a route between the source and the destination. For example, the traffic density may be low, medium or high. In some embodiments, Geolocation app (for example, GoogleMaps®) may be used to capture the traffic density or traffic congestion. Further, to capture the one or more in-transit parameters, various sensors may be mounted on the vehicle(s) or the range prediction device 102. Further, the value determination module 202 may be configured to determine a set of real-time values corresponding to the plurality of in-transit parameters 212 associated with the vehicle 214. For example, a real-time value corresponding to the average external temperature may be 37° C. The value determination module 202 may be further transmit the real-time values to the variance determination module 204 or the datastore.

The variance determination module 204 may be configured to determine a variance in the plurality of in-transit parameters 212 when compared with a set of pre-defined parameters 216. To determine the variance, the variance determination module 204 may communicate with the ML model 206. In some embodiments, the variance between the plurality of in-transit parameters 212 and the set of pre-defined parameters 216 may be determined through a statistical analyser. For example, mean, mode, and other similar operation may be performed through the statistical analyser.

The variance determination module 204 may also include a subset identification module 204*a*, a difference determination module 204*b*, and a computation module 204*c*. In one embodiment, the subset identification module 204*a* may identify an overlapping subset of parameters between the plurality of in-transit parameters 212 and the set of pre-defined parameters 216. In another embodiment, the subset identification module 204*a* may identify a non-overlapping subset of parameters between the plurality of in-transit parameters 212 and the set of pre-defined parameters 216. Further, the difference determination module 204*b* may be configured for determining a difference in each of the real-time values determined for the overlapping subset of parameters with a corresponding optimal value. Moreover, the variance may be computed based on the non-overlapping subset of parameters and the difference in real-time values determined for the overlapping subset of parameters through the computation module 204*c*. The variance determination module 204 may be operatively coupled to the percentage deviation determination module 208.

It should be noted that the plurality of in-transit parameters 212 is one of an equivalent set, a sub-set, or a super-set of a set of pre-defined parameters associated with a target vehicle (such as the vehicle 214). For example, the set of pre-defined parameters include a number of travellers, weight within the vehicle, vehicle specifications, a driver driving score, a source location and a destination location, traffic density, a travel direction, and current time. The in-transit parameters may include a number of travellers, weight within the vehicle, vehicle specifications a source location and a destination location, traffic density, a travel direction, and current time. In that case, the in-transit parameters may be the sub-set of the pre-defined parameters, as the driver driving score is not a part of the in-transit parameters. By way of another example, if all the parameters of the pre-defined parameters are present in the in-transit parameters, then the in-transit parameters may be the equivalent set of the predefined parameters. Further, if the in-transit parameters include all the predefined parameters (a number of travellers, weight within the vehicle, vehicle specifications, a driver driving score, a source location and a destination location, traffic density, a travel direction, and current and time) and additional parameters such as an average external temperature, aerodynamic conditions, a road inclination level. In that case, the in-transit parameters may be the super-set of the pre-defined parameters with additional parameters average external temperature, aerodynamic conditions, road inclination level.

The percentage deviation determination module 208 may be configured to determine a percentage deviation from an absolute driving range associated with the vehicle based on the determined variance. The absolute driving range may correspond to an ideal driving range. In some embodiments, the absolute driving range for the vehicle 214 may be obtained based on a set of optimal values for the set of pre-defined parameters 216. It should be noted that the set of optimal values may be associated with an ideal driving condition of the target vehicle. Also, it should be noted that the percentage deviation determination module 208 may determine the percentage deviation using the ML model 206. Further, the percentage deviation determination module 208 may be communicatively coupled to the driving range prediction module 210.

In some embodiments, the ML model 206 may be trained based on the set of pre-defined parameters associated with the vehicle. To train the ML model 206, the vehicle may be operated on a given path with a pre-determined value for each of the set of pre-defined parameters 216. Further, a driving range for the vehicle may be predicted, using the ML model 206, based on the pre-determined value of each of the set of pre-defined parameters 216. In some embodiments, an accuracy factor of the driving range predicted for the target vehicle may be determined. The accuracy factor may be determined by comparing the predicted driving range with an actual driving range of the target vehicle. Further, the ML model 206 may be optimized to predict the actual driving range for the target vehicle based on the determined accuracy factor. It should be noted that the ML model 206 may be trained for a plurality of paths based on the associated set of pre-defined parameters 216. And, the trained ML model 206 may be configured for predicting a current driving range for a new path.

The driving range prediction module 210 may be configured to predict a current driving range for the vehicle 214. The current driving range may be predicted based on the identified percentage deviation. In some embodiments, the percentage deviation and the predicted current driving range corresponding to the vehicle 214 may be rendered as recommendations 218 to a user. The recommendations 218 may be render via a user interface. Further, the user may respond to the range prediction device upon receiving the recommendations 218. In other words, the range prediction device 102 may receive a user response corresponding to an accuracy of the recommendations 218. The user response may be one of a positive user response or a negative user response. For example, the user may provide a positive response when the recommendations 218 provided by the range prediction device are correct. And, the user may provide a negative response when the recommendations 218 provided by the range prediction device 102 are incorrect. In this case the ML model 206 may require incremental training. Therefore, in some embodiments, incremental training of the ML model 206 may be performed based on the user response and the associated recommendation based on a reinforcement learning technique. While performing the incremental training, the ML model 206 may be rewarded (by +1 reward) or penalized (by −1 penalty) based on the user response.

The vehicle 214 may be one of an Electrical Vehicle (EV) or a fuel-based vehicle. The EV may include a Battery Electric Vehicle (BEV), a Plug-in Hybrid Electric Vehicles (PHEV), and a Hybrid Electric Vehicle (HEV).

The system 100 and associated range prediction device 102 may predict details regarding mileage and energy required per kilometer. One of the advantages of the range prediction device 102 may be applicability in all EV models. For example, the range prediction device 102 may work with non-EV vehicles too. The range prediction may be performed based on various parameters such as number of travellers, weight of the vehicle(s), wind direction, and the like. Whenever there is a change in one or more of the parameters like number of travellers, wind in one direction, percentage deviation in the driving range may also changes (i.e., the change may positive percentage deviation or negative percentage deviation). It should be noted that the aerodynamics may change when the wind in direction is less. This percentage deviation may be further used to derive the energy as prediction. Relative impact may be considered and purely based on the positive or negative deviations.

The percentage deviation may be stored and the ML model 206 may predict range and energy dynamically based on various external and vehicle conditions. In one example, travel angle (i.e., wind direction), outside temperature, ideal to other scenarios including uphill/downhill conditions may be considered to capture differential data.

The percentage difference depending on the time and condition may be noted for further processing. This may help the ML model 206 to predict range dynamically with differential data from one car to other. Additionally, in some embodiments, a battery type, EV specifications, may also be considered, resulting in planning for charging of EV accordingly. It should be noted that the ML model classifies the data based on the parameters and segment it to calculate the driving range.

In short, when the range prediction device 102 is in operating mode, data (different parameters) may be captured and processed in the form of text and further consolidation and classification is performed and adhered. Further, the statistical analyser may modularize the data collected and transformed and facilitates to form a data set during the machine learning process. Further, mean, mode, and similar operations may be performed for processing the data to the ML model 206. The ML model 206 helps in determining difference in percentage across ideal and other in-transit conditions to derive the relative impact. Hence, decisions may be taken considering the external factors sequentially and provided as predictions. The predictions may be sent to the user/cloud. The predictions may help the user to charge the EV. The cloud may store text events with the tag of the vehicle owner. Once this information is requested on the event, the system would respond accordingly.

It should be noted that the system 100 and associated range prediction device 102 may be implemented in programmable hardware devices such as programmable gate arrays, programmable array logic, programmable logic devices, or the like. Alternatively, the system 100 and range prediction device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/ module. Indeed, an engine or a module of executable code may be a single instruction, or many instructions, and may even be distributed over several different code segments, among different applications, and across several memory devices.

As will be appreciated by one skilled in the art, a variety of processes may be employed for dynamically predicting driving range of vehicles. For example, the exemplary system 100 and the range prediction device 102 may dynamically predict driving range of vehicles, by the process discussed herein. In particular, as will be appreciated by those of ordinary skill in the art, control logic and/or automated routines for performing the techniques and steps described herein may be implemented by the system 100 and the range prediction device 102 either by hardware, software, or combinations of hardware and software. For example, suitable code may be accessed and executed by the processor 106 in the range prediction device 102 to perform some or all of the techniques described herein. Similarly, application specific integrated circuits (ASICs) configured to perform some or all the processes described herein may be included in the processor 106 in the range prediction device 102.

Figure 3:
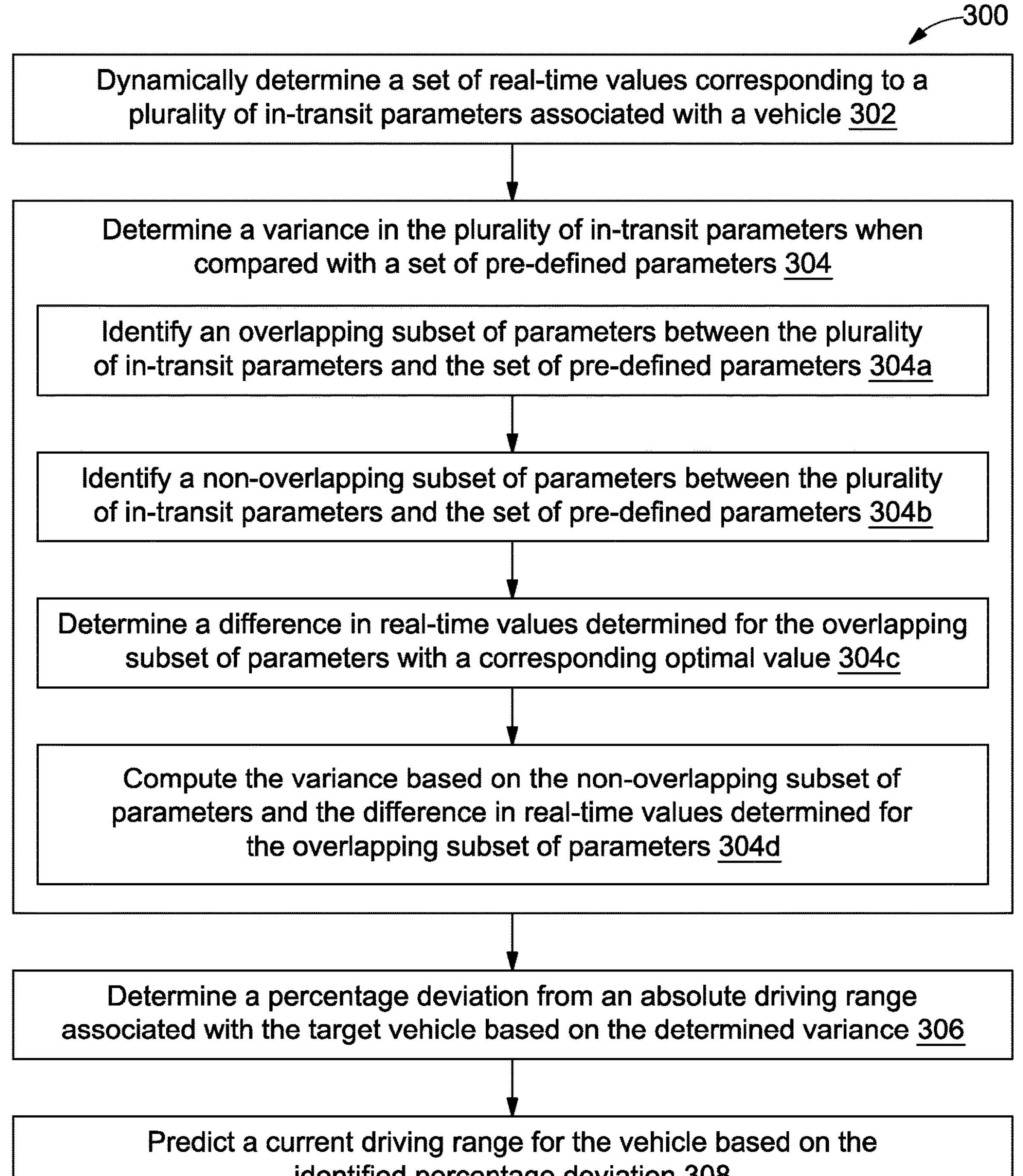
FIG. 3 is a flowchart of a method for dynamically predicting driving range of vehicles, in accordance with an embodiment.

Referring now to FIG. 3, a method for dynamically predicting driving range of vehicles via a flowchart 300, in accordance with an embodiment. Each step of the method may be executed by various modules of a range prediction device (similar to the modules 202-210 of the range prediction device 102). FIG. 3 is explained in conjunction with FIGS. 1-2.

At step 302, a set of real-time values corresponding to a plurality of in-transit parameters (same as the in-transit parameters 212) associated with a vehicle (for example, the vehicle 214) may be determined. It should be noted that the vehicle may be one of an Electrical Vehicle (EV) or a fuel-based vehicle. Further, the EV may include a Battery Electric Vehicle (BEV), a Plug-in Hybrid Electric Vehicles (PHEV), and a Hybrid Electric Vehicle (HEV). The plurality of in-transit parameters may include a set of external parameters and a set of vehicle parameters (for example, the set of external parameters 212*a* and the set of vehicle parameters 212*b*). The set of external parameters may include a total distance between a source location and a destination location, traffic density, a travel direction, current time, an average external temperature, an expected variation in temperature, aerodynamic conditions, a road inclination level, a road declination level road condition, and weather conditions. And, the set of vehicle parameters may include a number of travellers, weight within the vehicle, vehicle specifications, a driver driving score, and current functional condition of the vehicle. The plurality of in-transit parameters may be one of an equivalent set, a sub-set, or a super-set of a set of pre-defined parameters associated with a target vehicle.

Further, at step 304, a variance in the plurality of in-transit parameters when compared with a set of pre-defined parameters (similar to the set of pre-defined parameters 216) may be determined through a trained ML model (such as the ML model 206). The variance between the plurality of in-transit parameters and the set of pre-defined parameters may be determined through a statistical analyser. In some embodiments, at step 304*a*, an overlapping subset of parameters may be identified between the plurality of in-transit parameters and the set of pre-defined parameters. Further, at step 304*b*, a non-overlapping subset of parameters may be identified between the plurality of in-transit parameters and the set of pre-defined parameters. Further, in some embodiments, 304*c*, a difference in each of the real-time values determined for the overlapping subset of parameters with a corresponding optimal value may be determined. Moreover, at step 304*d*, the variance may be computed based on the non-overlapping subset of parameters and the difference in real-time values determined for the overlapping subset of parameters.

At step 306, a percentage deviation from an absolute driving range associated with the vehicle may be determined. To determine the percentage deviation, the variance may be considered. In some embodiments, the absolute driving range may be obtained for the vehicle based on a set of optimal values for the set of pre-defined parameters. The set of optimal values may be associated with an ideal driving condition of the target vehicle. After that, at step 308, a current driving range for the vehicle may be predicted based on the identified percentage deviation.

Figure 4:
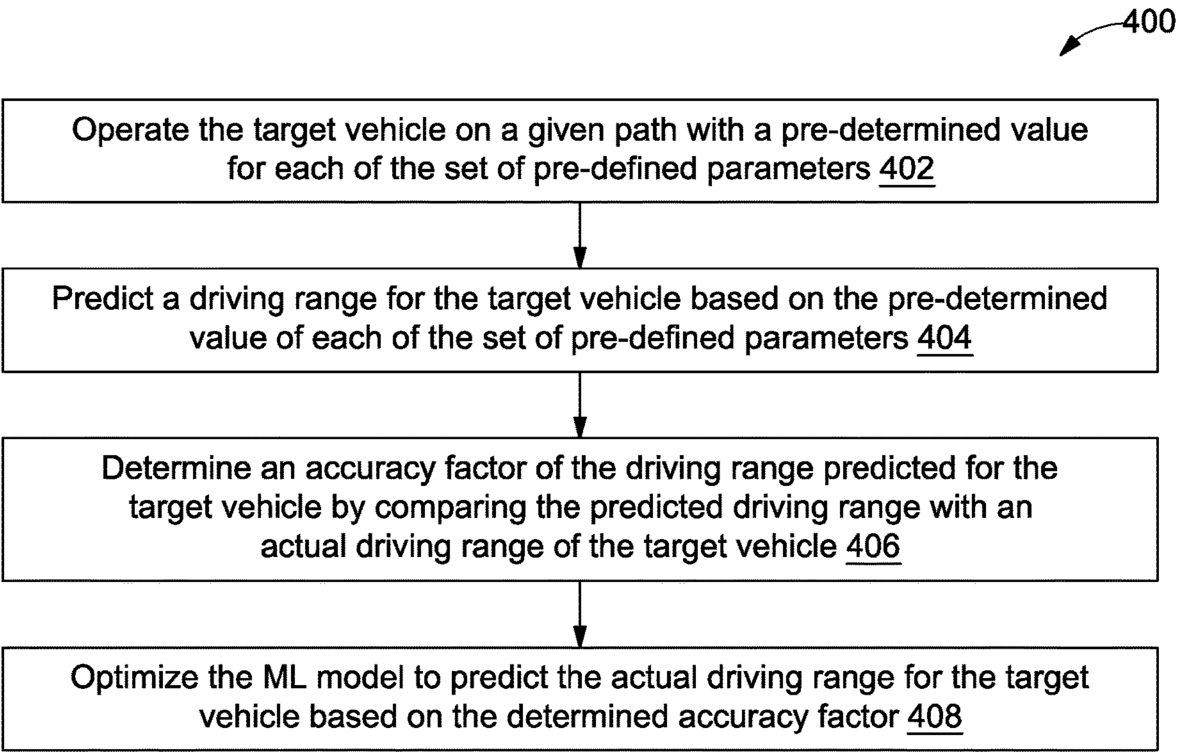
FIG. 4 is a flowchart of a method training an ML model based on pre-defined parameters associated with a target vehicle, in accordance with an embodiment.

Referring now to FIG. 4, a method for training an ML model (same as the ML model 206) based on pre-defined parameters associated with a target vehicle is depicted via a flowchart 400, in accordance with an embodiment. FIG. 4 is explained in conjunction with FIGS. 1-3. At step 402, the vehicle may be operated on a given path with a predetermined value for each of the set of pre-defined parameters. Thereafter, at step 404, a driving range for the target vehicle may be predicted by the ML model. The driving range may be predicted based on the pre-determined value of each of the set of pre-defined parameters. At step 406, an accuracy factor of the driving range predicted for the target vehicle may be determined. The accuracy factor may be determined by comparing the predicted driving range with an actual driving range of the target vehicle. At step 408, the ML model may be optimized. The optimized ML model may be able to predict the actual driving range for the target vehicle based on the determined accuracy factor.

Figure 5:
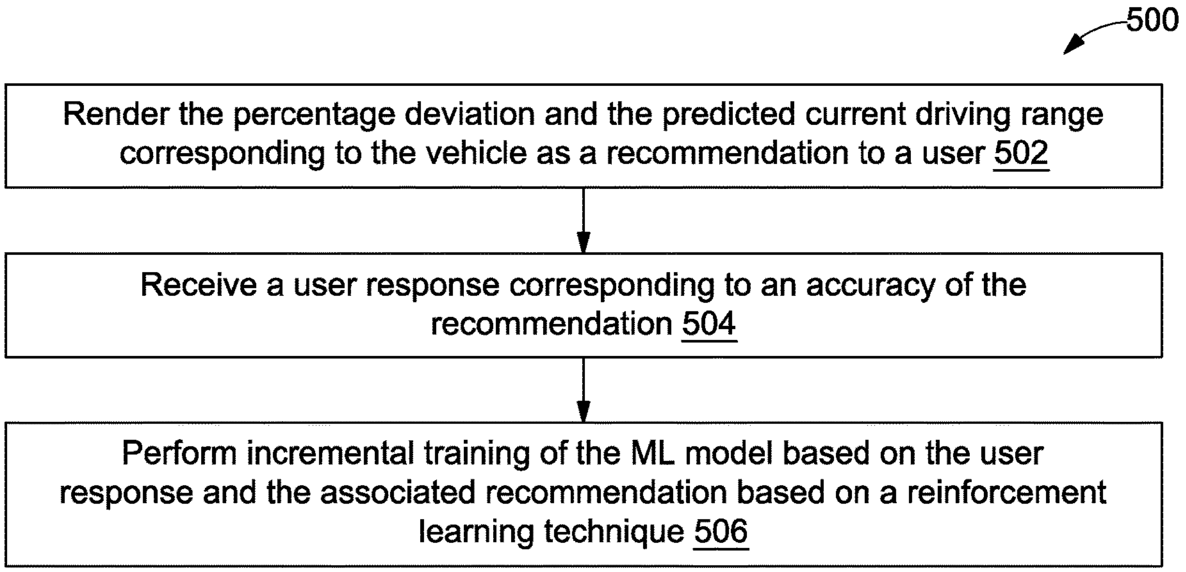
FIG. 5 is a flowchart of a method for performing incremental learning of the ML model, in accordance with an embodiment.

Referring now to FIG. 5, a method for performing incremental learning of the ML model is depicted via a flowchart 500, in accordance with an embodiment. FIG. 5 is explained in conjunction with FIGS. 1-4. At step 502, the percentage deviation and the predicted current driving range corresponding to the vehicle may be rendered as recommendations to a user. At step 504, a user response may be received corresponding to an accuracy of the recommendation. The user response may be one of a positive user response or a negative user response.

At step 506, incremental training of the ML model may be performed. The incremental training may be performed based on the user response and the associated recommendation based on a reinforcement learning technique. While performing incremental training of the ML model, the ML model may be rewarded, or penalizing, based on the user response.

In other words, if the dynamic range predicted is accurate, the user may make use of reward (for example, +1) or correct option which helps to re-model the collected data and transformed data. Timestamp may be used to find a series of actions taken in accordance with the policy or model in its implementation. For example, a current time for a particular performed action may be noted in text events. The series of action (for example, user input on accuracy of the ML model, and taking left turn or right turn) may be performed by the user while driving the car. Further, the text events are used for report or search purposes.

For example, in one embodiment, a total distance to be covered by a vehicle may be 234 km. Total distance may be captured based on source and destination locations. Further, to capture the traffic condition, high, low and medium traffic conditions may be considered. Out of the total distance 234 km, 198 km may have low traffic density, 33 km may have medium traffic density, and 3 km may have high traffic density. Further, there may be total 34 number of turns between the source location and destination location for a particular path. For example, the '34' number of turns may include '20' right turns and '14' left turns. Further, outside temperature may be 34° C. and temperature variance expected may be 20%. Road inclination may include high road inclination level, low road inclination level, and medium road inclination level. For example, high road inclination level may be for 5 km, low road inclination level may be 25 km, and medium road inclination level may be 33 km. Similarly, high road declination level may be for 25 km, low road declination level may be 5 km, and medium road declination level may be 18 km. The inclination and declination level represents positive or negative slope of the road during uphill or downhill travel. Further, driver driving score may be 80% evaluated based on historical driving of the driver. The car type may be 'Battery Electric Vehicle' and the weather condition may be 'No Rain and 37° C. temperature'.

This exemplary data may be collected and transformed. Thus, a data set during the machine learning process may be formed. Further, statistical operation such as mean, mode, variance may be determined for processing the data.

The ML model 206 helps to identify the data and works on reinforcement learning algorithms. The difference in percentage across ideal and other conditions may be considered. For example, the percentage deviation may be computed. The relative impact based on the deviation may then be taken for analysis. This may help the range prediction device 102 to take decisions sequentially and provide predictions which is purely based on interacting with environmental factors.

By way of an example, consider a system where a vehicle service provider uses the range prediction device 102. The vehicle service provider may have a plurality of vehicles. Details related to each of the plurality of vehicles may be stored on a server. Now, if a customer wants to hire a vehicle, then the system may automatically select a vehicle based on requirement and current condition. In some embodiments, the customer may be asked to add source and destination locations via a user interface. So that an appropriate vehicle may be allotted to the customer. The system may predict driving range of the plurality of vehicle based on the source and destination location and other inputs provided by the customer. Further, the system may select the vehicle which is suitable for the customer for travelling.

Figure 6:
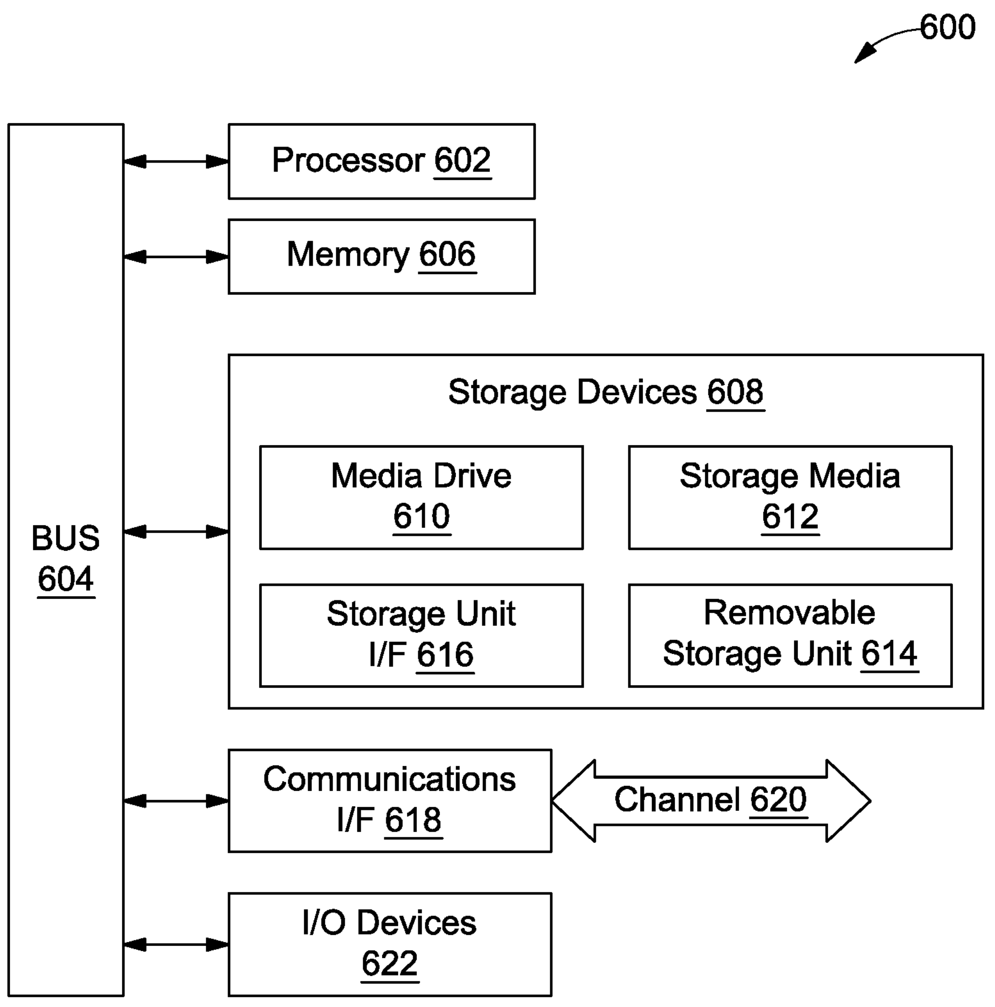
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 602 that may be implemented using a general or special purpose processing engine such as, for example, a microprocessor, microcontroller or other control logic. In this example, the processor 602 is connected to a bus 604 or other communication medium. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. The memory 606 also may be used for storing temporary variables or other intermediate information during execution of instructions to be executed by the processor 602. The computing system 600 may likewise include a read only memory ("ROM") or other static storage device coupled to bus 604 for storing static information and instructions for the processor 602.

The disclosure may be applicable for any type of vehicles, even on non-Electric Vehicle (EV) (i.e., petrol/diesel driven vehicles). The factors including, but are not limited to, environmental conditions (such as rain and flood), source to destination, route and traffic, and are considered for the deviation.

The computing system 600 may also include a storage device 608, which may include, for example, a media drives 610 and a removable storage interface. The media drive 610 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 606 may include, for example, a hard disk, magnetic tape, flash drive, or other fixed or removable medium that is read by and written to by the media drive 620. As these examples illustrate, the storage media 612 may include a computer-readable storage medium having stored there in particular computer software or data.

In alternative embodiments, the storage devices 608 may include other similar instrumentalities for allowing computer programs or other instructions or data to be loaded into the computing system 600. Such instrumentalities may include, for example, a removable storage unit 614 and a storage unit interface 616, such as a program cartridge and cartridge interface, a removable memory (for example, a flash memory or other removable memory module) and memory slot, and other removable storage units and interfaces that allow software and data to be transferred from the removable storage unit 614 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via a channel 620. The channel 620 may carry signals and may be implemented using a wireless medium, wire or cable, fiber optics, or other communications medium. Some examples of the channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and also display an output of the computation performed by the processor 602. In this document, the terms "computer program product" and "computer-readable medium" may be used generally to refer to media such as, for example, the memory 606, the storage devices 608, the removable storage unit 614, or signal(s) on the channel 620. These and other forms of computer-readable media may be involved in providing one or more sequences of one or more instructions to the processor 602 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 614, the media drive 610 or the communications interface 618. The control logic (in this example, software instructions or computer program code), when executed by the processor 602, causes the processor 602 to perform the functions of the invention as described herein.

Various embodiments provide method and system for dynamically predicting driving range of vehicles. The disclosed method and system may provide various advantages including minimal configuration overhead on data, maximum security, and system robustness for event traceability. The user may access the system via a mobile application or a browser client for searching and tracing the events on the vehicles. This may help the users to provide report based on importance of the events with respect to location, date, and the like.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for dynamically predicting driving range of vehicles, the method comprising:

dynamically determining, by a range prediction device, a set of real-time values corresponding to a plurality of in-transit parameters associated with a vehicle, wherein the plurality of in-transit parameters comprises a set of external parameters and a set of vehicle parameters;

training a ML model based on a set of pre-defined parameters associated with a target vehicle, wherein training the ML model comprises:

operating the target vehicle on a given path with a pre-determined value for each of the set of pre-defined parameters;

predicting, by the ML model, a driving range for the target vehicle based on the pre-determined value of each of the set of pre-defined parameters;

determining an accuracy factor of the driving range predicted for the target vehicle by comparing the predicted driving range with an actual driving range of the target vehicle; and optimizing the ML model to predict the actual driving range for the target vehicle based on the determined accuracy factor;

determining, by the range prediction device via a trained Machine Learning (ML) model, a variance in the plurality of in-transit parameters when compared with the set of pre-defined parameters, wherein determining the variance comprises:

identifying an overlapping subset of parameters between the plurality of in-transit parameters and the set of pre-defined parameters;

identifying a non-overlapping subset of parameters between the plurality of in-transit parameters and the set of pre-defined parameters;

determining a difference in each of the real-time values determined for the overlapping subset of parameters with a corresponding optimal value; and computing the variance based on the non-overlapping subset of parameters and the difference in real-time values determined for the overlapping subset of parameters;

determining, by the range prediction device via the trained ML model, a percentage deviation from an absolute driving range associated with the vehicle based on the determined variance; and predicting, by the range prediction device via the trained ML model, a current driving range for the vehicle based on the identified percentage deviation.

2. The method of claim 1, wherein the plurality of in-transit parameters is one of an equivalent set, a sub-set, or a super-set of a set of pre-defined parameters associated with a target vehicle.

3. The method of claim 1, further comprising obtaining the absolute driving range for the vehicle based on a set of optimal values for the set of pre-defined parameters, wherein the set of optimal values are associated with an ideal driving condition of the target vehicle.

4. The method of claim 1, wherein the ML model is trained for a plurality of paths based on an associated set of pre-defined parameters, and wherein the trained ML model is configured for predicting a current driving range for a new path.

5. The method of claim 1, wherein the variance between the plurality of in-transit parameters and the set of pre-defined parameters is determined through a statistical analyser.

6. The method of claim 1, wherein the set of external parameters comprises a total distance between a source location and a destination location, traffic density, a travel direction, current time, an average external temperature, an expected variation in temperature, aerodynamic conditions, a road inclination level, road condition, and weather conditions.

7. The method of claim 1, wherein the set of vehicle parameters comprises a number of travellers, weight within the vehicle, vehicle specifications, a driver driving score, and current functional condition of the vehicle.

8. The method of claim 1, further comprising rendering the percentage deviation and the predicted current driving range corresponding to the vehicle as a recommendation to a user.

9. The method of claim 8, further comprising receiving a user response corresponding to an accuracy of the recommendation, wherein the user response is one of a positive user response or a negative user response.

10. The method of claim 9, further comprising performing incremental training of the ML model based on the user response and the associated recommendation based on a reinforcement learning technique, wherein performing incremental training of the ML model comprises one of rewarding the ML model, or penalizing the ML model, based on the user response.

11. The method of claim 1, wherein the vehicle is one of an Electrical Vehicle (EV) or a fuel-based vehicle, and wherein the EV comprises a Battery Electric Vehicle (BEV), a Plug-in Hybrid Electric Vehicles (PHEV), and a Hybrid Electric Vehicle (HEV).

12. A system for dynamically predicting driving range of vehicles, the device comprising:

a processor; and a memory communicatively coupled to the processor, wherein the memory stores processor-executable instructions, which, on execution, causes the processor to:

dynamically determine a set of real-time values corresponding to a plurality of in-transit parameters associated with a vehicle, wherein the plurality of in-transit parameters comprises a set of external parameters and a set of vehicle parameters;

train a ML model based on a set of pre-defined parameters associated with a target vehicle, wherein training the ML model comprises:

operating the target vehicle on a given path with a pre-determined value for each of the set of pre-defined parameters;

predicting, by the ML model, a driving range for the target vehicle based on the pre-determined value of each of the set of pre-defined parameters;

determining an accuracy factor of the driving range predicted for the target vehicle by comparing the predicted driving range with an actual driving range of the target vehicle; and optimizing the ML model to predict the actual driving range for the target vehicle based on the determined accuracy factor;

determine, via a trained Machine Learning (ML) model, a variance in the plurality of in-transit parameters when compared with the set of pre-defined parameters, wherein determining the variance comprises:

identifying an overlapping subset of parameters between the plurality of in-transit parameters and the set of pre-defined parameters;

identifying a non-overlapping subset of parameters between the plurality of in-transit parameters and the set of pre-defined parameters;

determining a difference in each of the real-time values determined for the overlapping subset of parameters with a corresponding optimal value; and computing the variance based on the non-overlapping subset of parameters and the difference in real-time values determined for the overlapping subset of parameters;

determine, by the range prediction device via the trained ML model, a percentage deviation from an absolute driving range associated with the target vehicle based on the determined variance; and predict, by the range prediction device via the trained ML model, a current driving range for the vehicle based on the identified percentage deviation.

13. The system of claim 12, wherein the plurality of in-transit parameters is one of an equivalent set, a sub-set, or a super-set of a set of pre-defined parameters associated with a target vehicle.

14. The system of claim 12, wherein the processor-executable instructions cause the processor to obtain the absolute driving range for the vehicle based on a set of optimal values for the set of pre-defined parameters, wherein the set of optimal values are associated with an ideal driving condition of the target vehicle.

15. The system of claim 12, wherein the ML model is trained for a plurality of paths based on an associated set of pre-defined parameters, and wherein the trained ML model is configured for predicting a current driving range for a new path.

16. The system of claim 12, wherein the variance between the plurality of in-transit parameters and the set of pre-defined parameters is determined through a statistical analyser.

17. The system of claim 12, wherein the set of external parameters comprises a total distance between a source location and a destination location, traffic density, a travel direction, current time, an average external temperature, an expected variation in temperature, aerodynamic conditions, a road inclination level, road condition, and weather conditions.

18. The system of claim 12, wherein the set of vehicle parameters comprises a number of travellers, weight within the vehicle, vehicle specifications, a driver driving score, and current functional condition of the vehicle.

19. The system of claim 12, wherein the processor-executable instructions further cause the processor to render the percentage deviation and the predicted current driving range corresponding to the vehicle as a recommendation to a user.

20. The system of claim 19, wherein the processor-executable instructions further cause the processor to receive a user response corresponding to an accuracy of the recommendation, wherein the user response is one of a positive user response or a negative user response.

21. The system of claim 19, wherein the processor-executable instructions further cause the processor to perform incremental training of the ML model based on the user response and the associated recommendation based on a reinforcement learning technique, wherein training the ML model comprises one of rewarding the ML model, or penalizing the ML model, based on the user response.

22. The system of claim 12, wherein the vehicle is one of an Electrical Vehicle (EV) or a fuel-based vehicle, and wherein the EV comprises a Battery Electric Vehicle (BEV), a Plug-in Hybrid Electric Vehicles (PHEV), and a Hybrid Electric Vehicle (HEV).

23. A non-transitory computer-readable medium storing computer-executable instructions for dynamically predicting driving range of vehicles, the computer-executable instructions configured for:

dynamically determining a set of real-time values corresponding to a plurality of in-transit parameters associated with a vehicle, wherein the plurality of in-transit parameters comprises a set of external parameters and a set of vehicle parameters;

training a ML model based on a set of pre-defined parameters associated with a target vehicle, wherein training the ML model comprises:

operating the target vehicle on a given path with a pre-determined value for each of the set of pre-defined parameters;

predicting, by the ML model, a driving range for the target vehicle based on the pre-determined value of each of the set of pre-defined parameters;

determining an accuracy factor of the driving range predicted for the target vehicle by comparing the predicted driving range with an actual driving range of the target vehicle; and optimizing the ML model to predict the actual driving range for the target vehicle based on the determined accuracy factor;

determining, via a trained Machine Learning (ML) model, a variance in the plurality of in-transit parameters when compared with the set of pre-defined parameters, wherein determining the variance comprises:

identifying an overlapping subset of parameters between the plurality of in-transit parameters and the set of pre-defined parameters;

identifying a non-overlapping subset of parameters between the plurality of in-transit parameters and the set of pre-defined parameters;

determining a difference in each of the real-time values determined for the overlapping subset of parameters with a corresponding optimal value; and computing the variance based on the non-overlapping subset of parameters and the difference in real-time values determined for the overlapping subset of parameters;

determining, via the trained ML model, a percentage deviation from an absolute driving range associated with the target vehicle based on the determined variance; and predicting, via the trained ML model, a current driving range for the vehicle based on the identified percentage deviation.

* * * * *